Dec. 30, 1941.        C. S. ASH        2,268,329
BRAKING MEANS FOR DUAL WHEELS
Filed June 7, 1939        3 Sheets-Sheet 1

INVENTOR
Charles S. Ash.
BY
Morgan, Finnegan & Durham
ATTORNEYS

Dec. 30, 1941.　　　　　C. S. ASH　　　　　2,268,329

BRAKING MEANS FOR DUAL WHEELS

Filed June 7, 1939　　　　3 Sheets-Sheet 2

INVENTOR
C. S. Ash
BY
Kirgan Finnegan & Durham
ATTORNEYS

Dec. 30, 1941.   C. S. ASH   2,268,329
BRAKING MEANS FOR DUAL WHEELS
Filed June 7, 1939   3 Sheets-Sheet 3

INVENTOR
C. S. Ash
BY
Morgan Finnegan & Durham
ATTORNEYS

Patented Dec. 30, 1941

2,268,329

UNITED STATES PATENT OFFICE 2,268,329

BRAKING MEANS FOR DUAL WHEELS

Charles S. Ash, Milford, Mich.

Application June 7, 1939, Serial No. 277,868

7 Claims. (Cl. 188—18)

The invention relates to new and useful improvements in dual wheel assemblies for motor vehicles, and more particularly in improved pressure fluid operated braking means especially applicable to dual wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
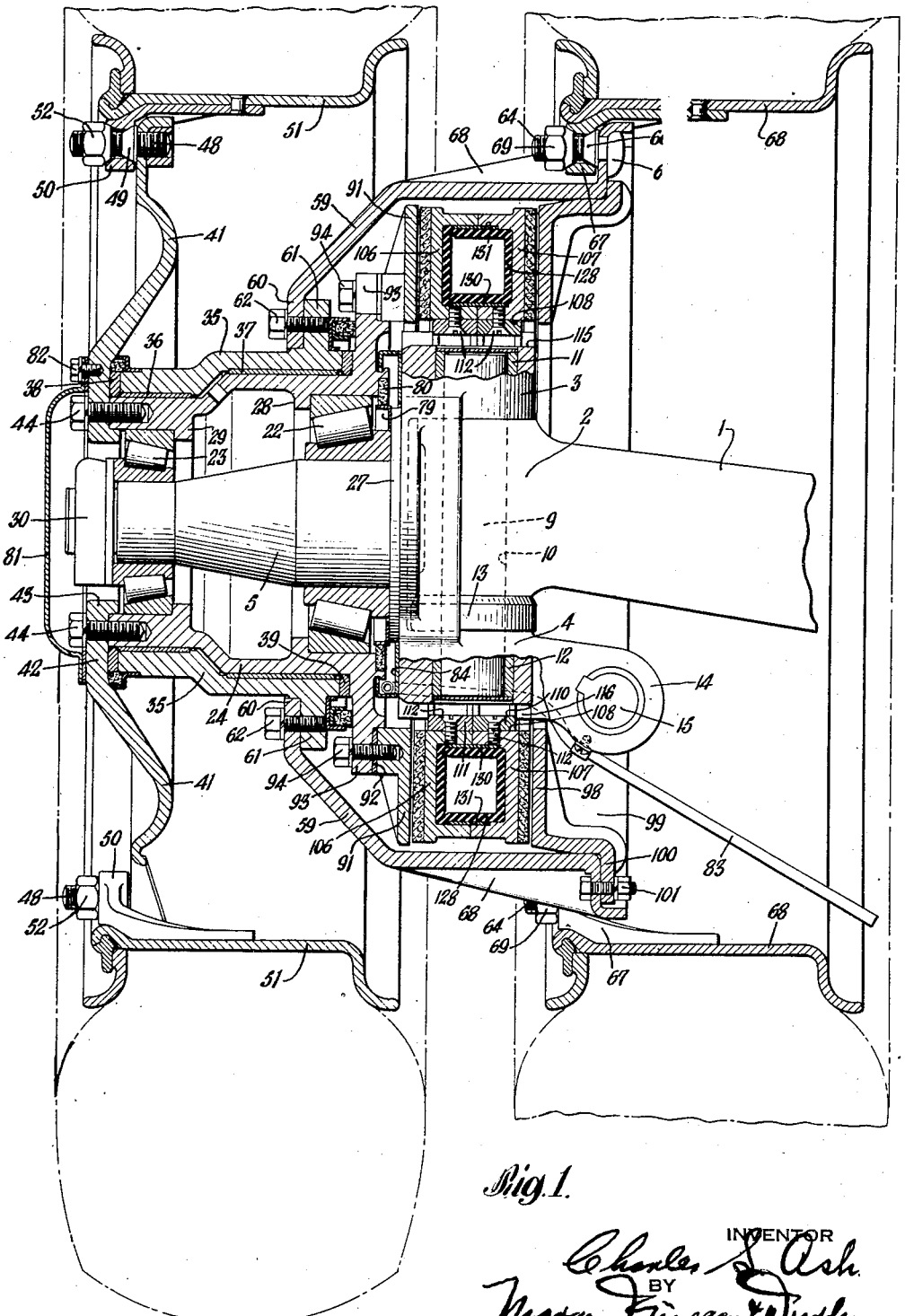
Fig. 1 is a vertical transverse section through a wheel assembly embodying the invention.

Objects of the present invention are to provide simple, sturdy, compact, powerful and uniformly acting braking means, particularly applicable to and useful with dual wheel assemblies, and especially with wheels of relatively small diameters; to provide braking means of the kind described employing brake shoes and coacting braking surfaces of the annular disc type, wherein the retarding pressures are not localized, or unequally applied, but are distributed over the complete flat surface and consequently there is less heat generated; to provide a maximum amount of braking surface in a minimum space; to provide smooth and easy operating, balanced braking action, which has a definite application to each wheel, and can apply very powerful pressure, so as to lock the wheels if desired; to provide for simple, direct and balanced application of the hydraulic or other pressure fluid directly to the brake shoes, and preferably concurrently, equally and directly between and to two opposed annular flat brake shoes, which press against similarly formed braking surfaces on a pair of dual wheels.

To this end, as at present preferably embodied and as applied to a dirigible dual wheel assembly, of the type shown in my copending application, Serial No. 263,347, filed March 22, 1939, now Patent No. 2,242,048 issued May 13, 1941, dual wheels are rotatively mounted on a spindle having a king pin and knuckle joint mounting on an end of the front axle beam, the spindle being angularly movable by the steering mechanism, and the axis of the king pin intersecting the ground between the treads of the two wheels. Two annular flat brake shoe discs are mounted side-by-side in vertical alinement with the king pin axis and concentric with the spindle axis, the brake shoes being axially movable apart from each other to engage with flat annular braking surfaces on the dual wheels, respectively, the brake shoes being forced apart, against spring pressure which normally presses them resiliently together, by hydraulic or other pressure fluid applying means acting from within and by means of a resilient envelope or container interposed between the brake shoes and expansible by the fluid pressure to move the brake shoes against restoring spring pressure, the fluid pressure being applied entirely about the brake shoes, or in restricted, that is angularly-balanced, separated areas about the circumference of the brake shoes. It will be understood that the foregoing general description, and the appended detail description as well, are exemplary and explanatory but are not restrictive of the invention.

Referring now in detail to the embodiment of the invention illustrated by way of example in the accompanying drawings, a front axle beam 1 is shown having dual wheels dirigibly mounted at either end thereof. The axle is equipped at either end with a knuckle 2, which is embraced between arms 3 and 4 of a yoke formed on the inner end of and integral with a spindle 5, upon which spindle the dual wheels are journaled as hereinafter described. Spindle 5 is mounted by means of its yoke and the knuckle to turn on a substantially vertical axis, and for this purpose a king pin 9 is mounted in a substantially vertically-disposed aperture 10 in the knuckle 2, and at either end the king pin projects into corresponding apertures formed in the top and bottom yoke arms 3 and 4 of the spindle. The ends of the spindle are journaled, respectively, in bushings 11 and 12 mounted in the corresponding yoke arm apertures, and an anti-friction thrust bearing 13 is interposed between the bottom of knuckle 2 and the top face of underneath yoke arm 4, to facilitate the turning of spindle 5 in response to the steering mechanism. The spindle is connected to the steering mechanism by suitable means, such as an arm 14, integral with yoke arm 4, to which is connected a rod 15 which is connected to the steering mechanism of the vehicle in a known or other suitable manner.

The side-by-side pair of dual wheels are rotatively mounted on spindle 5 to have free rotation with respect to the spindle and with respect to each other, broad and ample bearings being provided for each wheel hub within relatively compact dimensions. As embodied, each of the wheels has its hub of ample width and diameter, one of the hubs being nested within the other, suitable anti-friction bearings and lubricating facilities being provided to adequately meet the needs and requirements of heavy-duty vehicles. As here embodied, roller bearings 22 and 23 are mounted in well spaced-apart relation on the spindle 5, the hub 24 of the outboard wheel being journaled on these bearings. Bearing 22 is held axially in position by the inner side of its inner raceway abutting on a flange 27 formed on spindle 5, the outer side of the outer raceway of bearing 22 abutting on an inwardly-projecting flange 28, formed on the interior of the hub 24. Bearing 23 is held in position axially by having the inner side of its outer raceway abutting on an inwardly-projecting flange 29 formed on the interior of the hub 24, and having the outer side of its outer raceway abutting on a nut 30 screw-threaded on the outer end of spindle 5. The hub 35 of the inboard wheel is journaled on hub 24 of the outboard wheel, for the greater part of its extent, thereby providing an ample bearing for the inboard wheel, anti-friction bushings 36 and 37 being interposed between the finished surfaces of the two hubs. Thrust bearing washers 38 and 39, located at either end of hub 35, take up the end thrust between the two wheels.

The outboard wheel comprises a dished web 41, having an inner flat annular portion 42 abutting on the flat annular face of its hub 24, said annular portion terminating in an inwardly-projecting annular flange 43 that fits snugly within the bore of the hub. The wheel body is fastened to the hub by screw bolts 44 passing through the flat portion 42 of the web and screw-threaded into the wheel. The embodied rim-supporting means comprises a series of circumferentially-arranged, spaced-apart apertures in a flat annular peripheral part of web 41 of the wheel, into which apertures are screw-threaded bolts 48. The bolts have median, beveled collars 49 formed thereon. Apertured lugs 50, which are fixed to a tire rim 51, are supported on the bolts 48, and are held in fixed position by nuts 52, which clamp the lugs between collar 49 and the nut to hold the rim in position upon the wheel. The inboard wheel, as embodied, comprises a deeply-dished wheel web 59, having a flat, annular inner portion 60 that fits closely over the exterior of its hub 35, and its inner face abuts against the outer face of an annular, outwardly-extending flange 61 integral with the hub 35, and fastened thereto by screw bolts 62. The deeply-dished, inwardly-extending body 59 of the inboard wheel encircles the king pin joint and also the braking mechanism and extends inwardly beyond them, the tread of the inboard tire being inside of the joint and the braking mechanism. The embodied rim-supporting means of the inner wheel likewise comprises a series of circumferentially-arranged, spaced-apart apertures in a flat annular outer portion of the web 59, in which are bolts 64 having hooks 65 on their inner ends and median beveled collars 66 fixed thereto at the outer face of the web. Apertured lugs 67 are fixed to a wheel rim 68, are supported on bolts 64 and are held in place by nuts 69. Near its periphery, and spaced about its relatively cylindrical outer part, the dished wheel body 59 has rib-like corrugations 68 formed therein for strength, the periphery terminating in a flat outwardly-extending flange.

Means are provided for retaining lubricant on the wheel bearings by means of seating devices at the inner and outer ends of the spindle and hub-mountings, and as embodied, a flanged plate 79 and a sealing ring 80 are located between flange 27 of the spindle and the outer raceway of the bearing 22, as a closure between the outer face of the flange 27 and the inner end of hub 24 of the inner wheel. A cap 81 closes the outer end of the axle structure, abutting on the web 42 of the outboard wheel and fastened thereto by tap bolts 82. A flanged drainage or drip ring 84 is located at the inboard face of hub 24 to catch any dripping oil and a drain pipe 83 drains the surplus oil from the bearing and discharges it inside the inner wheel so as to clear the tires and prevent oil from discharging thereon.

In accordance with one feature of the invention, resiliently expansible, fluid-pressure actuated means operate directly on the brake shoes to effect the braking action, and in accordance with certain features of the invention direct, floating, resilient, fluid-pressure action is supplied to brake mechanisms of the type shown and described in my hereinbefore-mentioned copending applications, wherein a pair of flat, side-by-side, annular brake shoes are resiliently retracted when inactive and concurrently and to effect the braking action are equally forced apart by an interposed resilient envelope which contains and is expanded by the fluid pressure. As embodied, cooperating with opposed flat, annular brake shoes of the type described are two flat, annular braking surfaces which are located at either side of the brake shoes and are fixed, respectively, to the inboard and outboard wheels. A flat annular brake ring 91 for the outboard wheel fits into an annular recessed seat 92 formed in the inner face of an annular, outwardly-extending flange 93 formed integral with the inner end of hub 24, the brake ring being held in fixed position by screw bolts 94. A flat annular brake ring 98 for the inboard wheel is concentric with the brake ring 91 and is formed as part of an angled, annular plate 99 which is nested and supported within the inner opening of wheel web 59, the ring terminating in an outwardly-extending flange 100 abutting on the corresponding face of the web, the two parts being held together by bolts 101.

Figure 3:
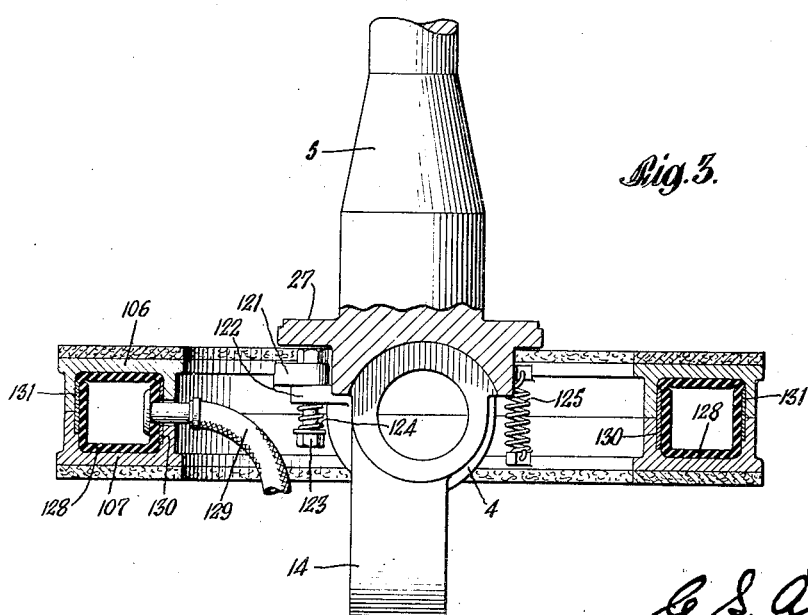
Fig. 3 is a section on line 3—3 of Fig. 2.

Interposed between the concentric brake rings 91 and 98 are two side-by-side, flat, annular, concentric brake shoes 106 and 107, which are channeled on their inner abutting faces as shown in Figs. 1 and 3. These brake shoes are movable axially to effect and release the braking action but are held against angular or rotational movement. As embodied, seats 108 are formed on the inner cylindrical surfaces of the two brake shoes in diametrically-opposite positions. Seated therein are retaining pieces 110 and 111, which are fixed in their seats by means of screws 112. The retaining pieces 110 and 111 project into seats 115 and 116 formed in the outer faces of the yoke arms 3 and 4. This permits axial but not angular movement of the brake shoes. Means are provided for keeping the brake shoes centered axially, clear of the braking members at either side, and so that they will turn with the spindle 5. As here embodied, apertured lugs 121 are formed at spaced-apart locations on the inner periphery of one of the brake shoes and coacting apertured lugs 122 are formed in a corresponding relation on one of the spindle yoke arms. A bolt 123 passes through the apertures in the pair of lugs 121, 122 and a compression spring 124 encircling the bolt resiliently holds the brake shoe in centered position against the lug 122. The two brake shoes 106 and 107 are resiliently pressed together by a spring 125, fixed to and in tension between the two brake shoes. The brake shoes are thus held centered and resiliently retracted.

Figure 2:
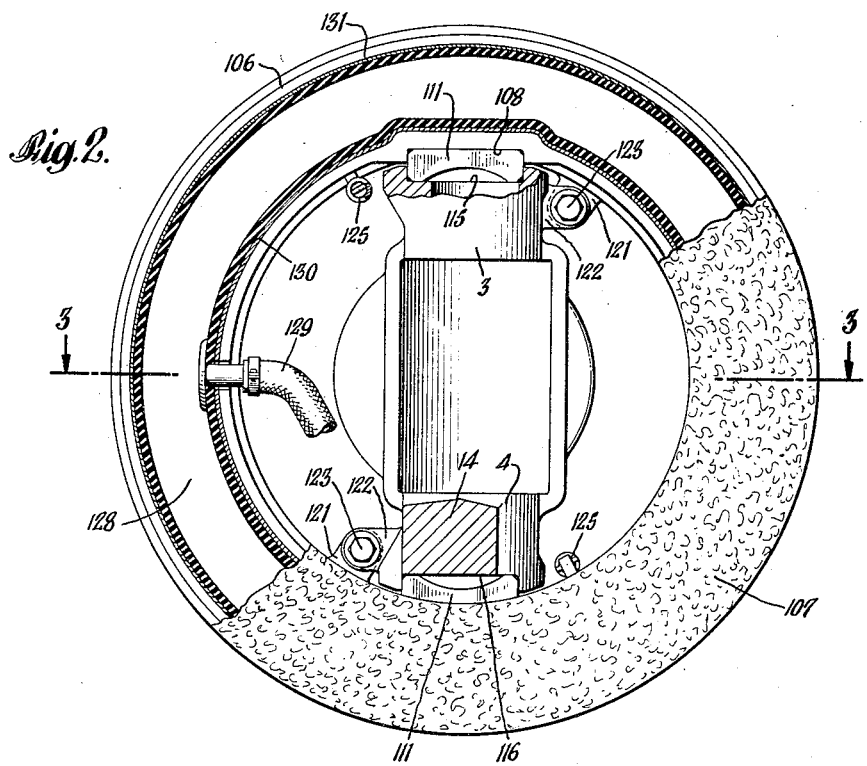
Fig. 2 is a detail elevation of the brake shoes with parts broken away to show the interior pressure-applying means.

Referring now to the embodied form of means for applying equalized floating resilient pressure of the brake shoes 106, 107 against the braking surfaces 91 and 98 of the wheels, there is shown in Figs. 1 and 2 a hollow annular, resilient, fluid-tight container or envelope 128 located within the channels of the brake shoes, and of corresponding cross-section so that on expansion it will exert equalized pressure. Envelope 128 has a tube or pipe connection 129 to a proper source of pressure fluid supply, the application of which is regulated by the vehicle driver in suitable manner, as by a brake pedal or other suitable device. In said figures the channeled interior of the brake shoes is shown of rectangular cross-section, and the envelope 128 of corresponding cross-sectional shape. Annular backing plates 130 and 131 are provided, located, respectively, between envelope 128 and the annular inner flanges and the annular outer flanges of the brake shoes, so as to medianly support the envelope 128 when the brake shoes are moved apart during the braking action. The cross-sectional form of the interior of the brake shoes and of the envelope 128 may be varied as desired or as found effective, and may be of circular, oval or other form.

Figure 4:
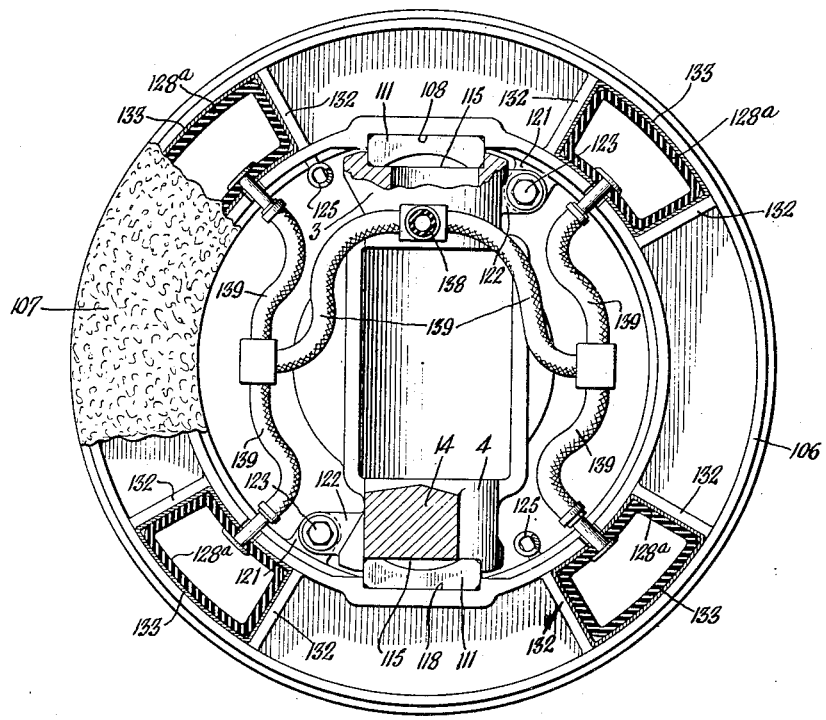
Fig. 4 is a detail view similar to Fig. 1, but showing a modified form.

In Fig. 4 a different form of the resilient, pressure-fluid brake-actuating means is shown wherein a plurality of hollow, resilient pressure-applying containers 128ª of sectorlike form are disposed in symmetrical, spaced-apart relationship about and within the brake shoes, and operate to apply the braking pressure in the manner already described. The pressure-fluid containers are thus of smaller size, as many as are needed may be used, and they may be applied to any proportional area of the brake shoes. As embodied, each of the interior annular channels of the brake shoes 106 and 107 is separated into chambers by cross-partitions 132, these partitions in the two brake shoes being alined so as to form the chambers at different points circumferentially about and within the brake shoes, and these chambers may be of varying size or number as may be found desirable or most effective to meet particular cases or conditions. The resilient containers 128ª are shaped to fill their chambers, and under the action of the pressure fluid, they move the brake shoes apart axially to exert the braking pressure in the manner already described. Additional pressure plates 133 will be supplied at the ends of the chambers, just within the cross-partitions 132 to take up the pressure of the container 128ª as the brake shoes move apart. In this form the fluid pressure is supplied through a manifold conduit 138 from which branch conduits 139 extend to the various containers 128ª, so that they are all concurrently put under equal pressure, the application of the pressure being controlled by the vehicle driver through any suitable means such as a foot pedal, valve lever, or other suitable device.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly, a pair of side by side dual wheels mounted for independent rotation, a pair of brake members, one connected to each wheel, brake shoe members frictionally engageable with said brake members, resilient means normally holding the brake shoes out of contact with said brake members and means for applying the braking pressure comprising a resilient container located between said dual wheels and expansible by fluid pressure said container being engageable with both of said brake shoes to press the brake shoes against the brake members.

2. In a dual wheel assembly, a pair of side by side dual wheels mounted for independent rotation, a pair of brake members, one connected to each wheel, brake shoe members frictionally engageable with said brake members, resilient means normally holding the brake shoes out of contact with said brake members and means for applying the braking pressure comprising a resilient container located between and engaging both brake shoes and expansible by fluid pressure to press the brake shoes against the brake members.

3. In a dual wheel assembly, a pair of side by side dual wheels mounted for independent rotation, a pair of flat annular brake members, one connected to each wheel, flat annular, internally channeled brake shoes located between said brake members and means for pressing said brake shoes against said brake members, comprising a resilient container enclosed within said annular brake shoes and expansible by fluid pressure to press the brake shoes against the brake members.

4. In a dual wheel assembly, a pair of side by side dual wheels mounted for independent rotation, a pair of flat annular brake members, one connected to each wheel, concentric flat annular brake shoes located between said brake members, means resiliently holding the brake shoes in retracted position, and means for pressing said brake shoes against said brake members, comprising a resilient container expansible by fluid pressure to axially move and press the brake shoes against the brake members.

5. In a dual wheel assembly, a pair of side by side dual wheels mounted for independent rotation, a pair of flat annular brake members, one connected to each wheel, flat annular brake shoes located between said brake members and means for pressing said brake shoes against said brake members, comprising a resilient arcuate container expansible by fluid pressure engaging both brake shoes and operating equally on them to press the brake shoes against the brake members.

6. In a dual wheel assembly, a pair of side by side dual wheels mounted for independent rotation, a pair of flat annular brake members, one connected to each wheel, flat annular channeled brake shoes located between said brake members, disposed back to back, a resilient container within the channels of said brake shoes and expansible by fluid pressure to move the brake shoes axially to press the shoes against the brake members.

7. In a dual wheel assembly, a pair of side by side dual wheels mounted for independent rotation, a pair of flat annular brake members, one connected to each wheel, flat annular channeled brake shoes located between said brake members, disposed back to back, a plurality of spaced apart resilient arcuate containers within the channels of said brake shoes and expansible by fluid pressure to move the brake shoes axially to press the shoes against the brake members.

CHARLES S. ASH.